United States Patent [19]

Swillinger

[11] Patent Number: 4,834,330
[45] Date of Patent: May 30, 1989

[54] ANTI-REFLECTION OVERLAY MEMBER ARRANGEMENT

[75] Inventor: Francis L. Swillinger, Moorestown, N.J.

[73] Assignee: Denton Vacuum Inc., Cherry Hill, N.J.

[21] Appl. No.: 874,654

[22] Filed: Jun. 16, 1986

[51] Int. Cl.[4] ............................................. A47B 96/00
[52] U.S. Cl. ................... 248/205.2; 248/1 B; 358/252; 358/255; 400/713
[58] Field of Search .................. 248/205.2, 444.1, 448, 248/488, 1, 1 A, 1 B; 273/DIG. 28; 40/11 R, 156; 358/252, 255; 400/83, 713

[56] References Cited

U.S. PATENT DOCUMENTS

| | | | |
|---|---|---|---|
| 1,990,143 | 2/1935 | Snow | 350/276 X |
| 2,511,590 | 6/1950 | Keck | 350/276 R |
| 3,327,419 | 6/1967 | Stamos | 248/205.2 |
| 3,582,189 | 6/1971 | Moritz | 358/252 X |
| 3,627,926 | 12/1971 | Nichols | 273/DIG. 28 X |
| 3,671,004 | 6/1972 | Cram | 248/488 X |
| 3,936,968 | 2/1976 | Gilbert | 248/488 X |
| 4,246,613 | 1/1981 | Choder et al. | 358/255 X |
| 4,253,737 | 3/1981 | Thomsen et al. | 358/252 X |
| 4,427,264 | 1/1984 | Kamerling | 358/252 X |
| 4,444,465 | 4/1984 | Giulie et al. | 350/276 R |

FOREIGN PATENT DOCUMENTS 1157074  5/1958  France ........................... 350/276 R Primary Examiner—J. Franklin Foss
Assistant Examiner—David L. Talbott
Attorney, Agent, or Firm—William E. Cleaver

[57] ABSTRACT

The present arrangement includes a plurality of support members each having a slot therein and wherein each slot is substantially equal to the thickness of a viewing member (an overlay piece). The viewing member is formed to not reflect light, that is to have a light anti-relection characteristic and is disposed between a viewer and the item to be viewed. The support members are slipped slotwise over the edges of the overlay piece and provide supports to hold the overlay piece on the item to be viewed and permit removable therefrom without interfering with the view of the item to be viewed. In one embodiment the overlay member is movably mounted through the support members.

4 Claims, 2 Drawing Sheets

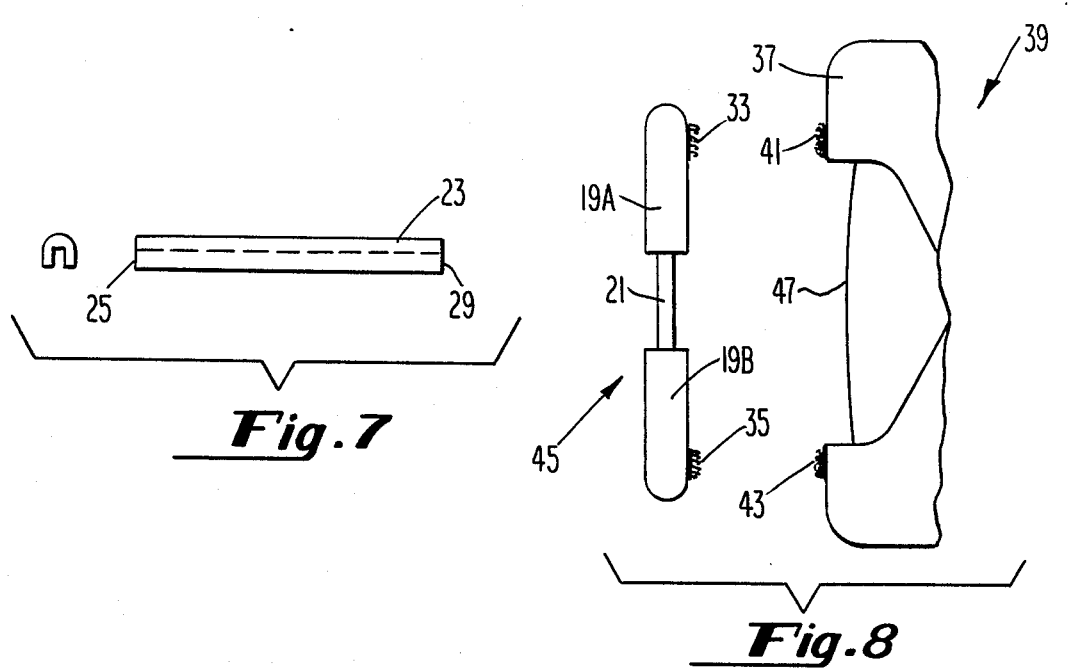
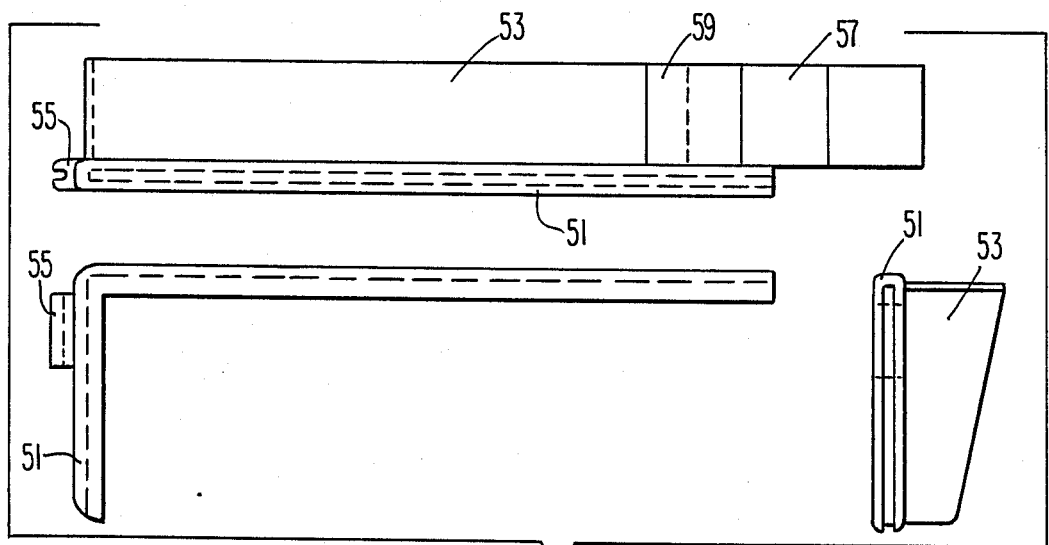
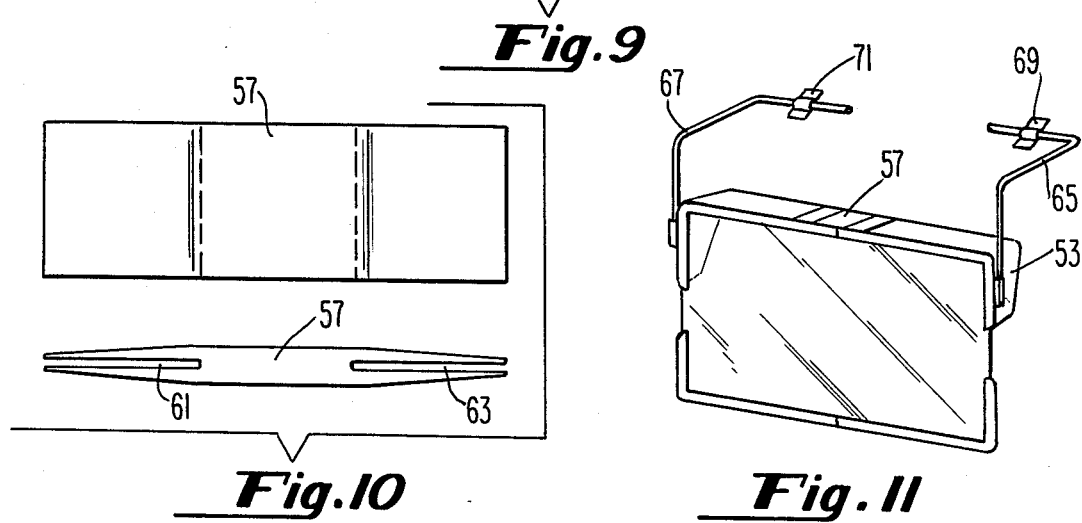

ANTI-REFLECTION OVERLAY MEMBER ARRANGEMENT

BACKGROUND OF THE INVENTION

Data processing terminals, word processing display devices, instruments with instrument panels and the like have drastically increased in number and in every day usage in our modern business and scientific world. More often than not the data processing terminals, word processing display devices and the instrument panels are located in rooms wherein there are many light sources to accommodate the many other business and scientific activities which continually take place in such rooms. These various light sources (including unshaded windows) transmit light to the terminal screen, or the word processor display screen on the instrument panel and such light is reflected therefrom so that the user very often squints and strains to read the displayed data, or the pointer position. Such squinting and/or straining results in sore eyes, sometimes dizziness and in general fatigue. There have been a number of successful attempts at removing the glare and improving the contrast of the letters and numerals displayed, by employing anti-reflection glass or anti-reflection plastic pieces mounted between the terminal screen and the viewer. Such anti-reflection overlays have been successfully cut to size and mounted at the factory. However, the millions of terminals which have been sold and are functioning in the field without such anti-reflection members represent a source of fatigue to the users thereof and it is to that segment of business and scientific endeavor that the present arrangement has great appeal. Be that as it may the present arrangement is advantageously employed at the factory, i.e., whereat an anti-reflection overlay is installed originally, because the present arrangement enables the user to remove the overlay easily and clean both the display screen and the back of the overlay which procedures are not readily available to some factory installed overlay member arrangements.

SUMMARY OF THE INVENTION

The present arrangement for providing an anti-reflection overlay member between a display screen, or instrument panel, and the viewer includes a set of standard, "one size fits all" support members. Each support member is formed to have a slot therein which slot is substantially equal to the thickness of the glass or plastic overlay. Accordingly, the support members fit snugly onto the overlay member and can be (and are) disposed to hold the overlay member in a substantially parallel position to the display screen and in close proximity to a data display screen to be viewed. The support members can be secured to the housing or perimeter of the display screen by an adhesive material or, as in the preferred embodiment, can be formed to interlock with matching support members which are secured to the housing of the display means. In this last mentioned embodiment, the overlay member is easily removed for cleaning as described above. In addition, this last mentioned embodiment enables the "one size fits all" concept because the anti-reflection glass or plastic can be readily cut to size, the support members can be readily fitted along the edges of the glass or plastic members, and finally the matching support members are located on the display screen housing to interlock the support members which are fitted onto the glass or plastic member. The support members, which can be of cast metal and which in an preferred embodiment are molded ABS Plastic pieces (which plastic is manufactured by many companies), can be one size or can be one major size and one minor size. Hence the many different display screens presently in use in the field can be accommodated irrespective of size and an anti-reflection overlay can be readily mounted thereon.

The object and features of the present invention can be better understood by studying the following description taken in conjunction with the drawings wherein:

FIG. 7 depicts a filler support member;

FIG. 8 shows the anti-reflection glass piece of FIG. 5 being removably mounted on a housing wherein there is located a display screen;

FIG. 9 shows three views of a hood attached to support means;

FIG. 10 shows a connector piece for two sides of a hood; and

FIG. 11 is a pictorial view of a hood arrangement.

Figure 1:
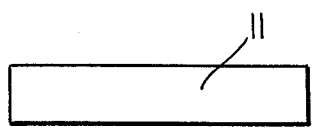
FIG. 1 depicts a support member.
Figure 2:
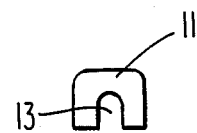
FIG. 2 depicts a side view of the support member of FIG. 1.

Consider FIG. 1. In FIG. 1 there is shown a single support member 11. In a preferred embodiment, the support member 11 is formed of ABS plastic and is molded to provide an internal slot 13 which is shown in FIG. 2. The slot 13 is substantially the width of the thickness of the anti-reflection plastic piece 15. Actually the width of slot 13 is slightly less than the thickness of the anti-reflection plastic piece 15 so that when the support member 11 is fitted over the edge of the anti-reflection plastic piece 15, the slot will be spread and cling to the plastic piece. As will be explained later, the support member is secured to the glass or plastic by a cement or glue, in a preferred embodiment. It should be understood that although the discussion refers to both glass and plastic pieces as being anti-reflection members they are to be considered interchangeable and other anti-reflection means such as: wire or nylon mesh, and the like, are to be included within the spirit of the present invention.

Figure 3:
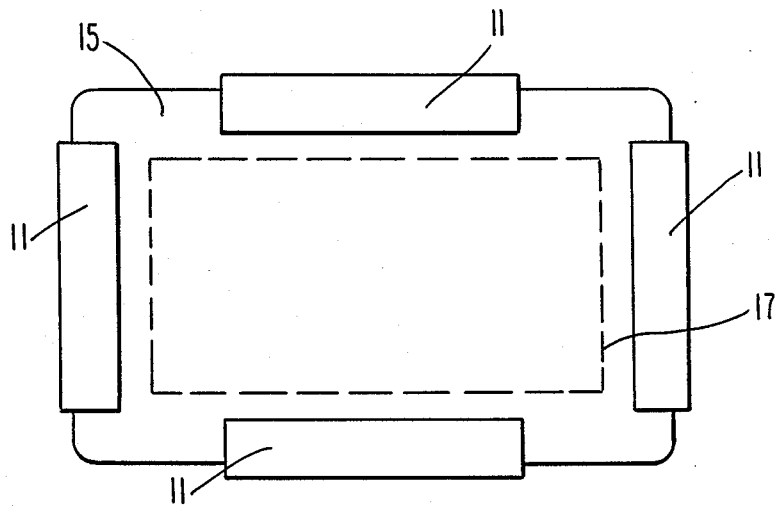
FIG. 3 shows an anti-reflection molded piece with the support member of FIG. 1 fitted thereon.

FIG. 3 depicts four support members 11 fitted onto a plastic anti-reflection overlay member 15. In one embodiment on the rear side of each support member there is secured an adhesive layer of hook formed material while the matching support means (mounted on the display housing) is an adhesive layer of loop formed material. The hook material is pressed into the loop material and the overlay member tenaciously clings to the housing. One brand name of such hook and loop material is VELCRO. It should be understood that other forms of mechanical interlocking devices can be employed. In FIG. 3 the dashed line 17 defines the boundaries of the display screen which sets behind the anti-reflection overlay 15.

Figure 4:
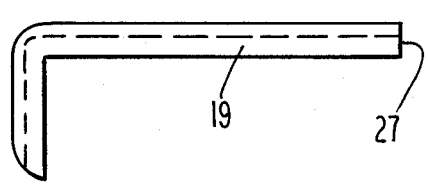
FIG. 4 depicts a corner shaped support member.
Figure 5:
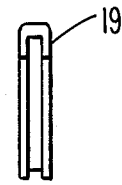
FIG. 5 is a side view of FIG. 4.

FIG. 4 depicts an aesthetically preferable support member 19. As can be seen in FIG. 4, the support member 19 is corner shaped. It is considered aesthetically preferable because two corner support members can be joined together, as shown in FIG. 6, to form a frame.

Figure 6:
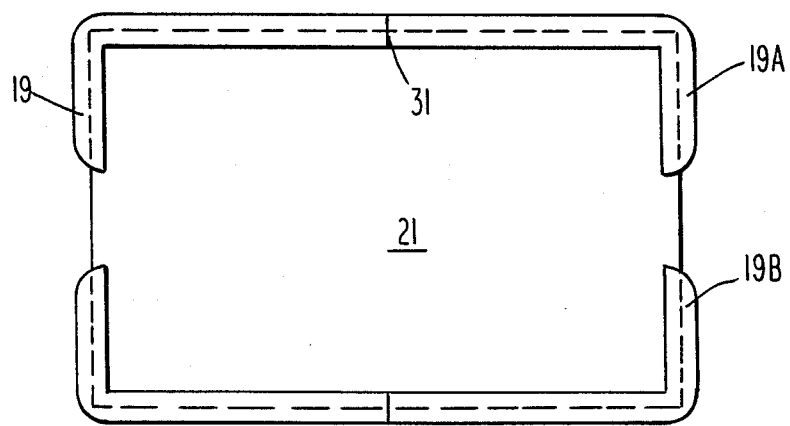
FIG. 6 shows an anti-reflection glass piece with a corner shaped support member fitted thereon.

Note that the corner piece of FIG. 4 is longer than that shown in FIG. 6. The "one piece fits all" philosophy of the present invention dictates that the original form of the corner piece be one half as long along its horizontal dimension as the longest overlay with which it is to be employed. The molded plastic is easily cut, by the user. In addition, the anti-reflection glass is provided in the many necessary sizes as an off the shelf items by the supplier. The user obtains the anti-reflection glass overlay "off the shelf," measures the horizontal length of the anti-reflection overlay member 21 and cuts the horizontal extension of the corner shaped support piece to size. The corner support pieces are then fitted by virtue of the slot over the edges of the anti-reflection glass member 21. This simple procedure eliminates the necessity of framing at the factory. As shown in FIG. 6 the two corner shaped support members abut at the center and form the upper half of a frame support. Likewise, the two bottom corner shaped support members 19 are readily cut to size and form the lower half of a frame support. Although it is not so depicted in FIG. 6, it should be understood that the vertical legs of the corner shaped support member can be originally longer and later cut such that they abut and form a full frame. In FIG. 6 the vertical legs are shown "rounded" to provide a good aesthetic look. It should be understood that although the present description describes straight support members and corner shaped support members, the support members can be formed to fit polygon shaped, or circular shaped, or arcuately shaped, anti-reflection overlay members.

FIG. 7 shows a filler support member 23. In the event that the two corner shaped support members 19 are not long enough to abut (i.e., the screen requires an extraordinary-long overlay) then a filler support member 23 is cut to size so that its left edge 25 abuts the edge 27 of the corner support piece 19 in FIG. 4, while the edge 29 of the filler support member abuts the end 31 of the corner shaped piece 19A in FIG. 6. The filler support member provides a support means for a relatively long overlay member and in addition provides a means to complete a frame structure either completely around the overlay member or along the upper or lower halves.

FIG. 8 shows a side view of the anti-reflection glass overlay 21 with the corner shaped support member 19A and 19B fitted thereon. As can be seen in FIG. 8 on the rear side of the corner shaped support members there are secured the hook material layers 33 and 35. Also as can be seen in FIG. 8, there are located matching loop material layers 41 and 43. When the layer 33 is meshed with the layer 41 and the layer 35 is meshed with the layer 43 the hooks will interlock the loops and the overlay assembly 45 will be mounted on the housing 37. It should be understood that there are many hook material layers such as layers 33 and 35 secured to the support members around the anti-reflection glass member 21. In a matching fashion there are many loop material layers, such as layers 41 and 43 located around the housing 37. When all of the hook layers are intermeshed with the loop layers the anti-reflection member is held firmly in place. At the same time it should be recognized that the overlay assembly can be readily removed from the housing 37 in order to clean both the anti-reflection glass member and the screen 47. It should also be understood that mechanical brackets or other forms of interlocking devices can be used in place of the hook and loop layers.

It is also known that the screens of certain display devices are bowed, or arcuate, in shape and hence provide a gap between a flat overlay member and the screen. Accordingly, ambient light enter the gap and reflects from the screen and reduces the effectiveness of the anti-reflection overlay member. FIGS. 9, 10 and 11 depict an embodiment of the present invention which deals with the gap problem. In FIG. 9 there is shown a corner shaped piece 51 with a hood section 53 secured thereto. The hood section can be part of a singular molded piece with the corner shaped support member 51, or the hood can be secured by an adhesive to the corner shaped support member 51, or mechanically fastened thereto. The clip piece 55 shown in the front view and top view is used to hold a bracket means shown in FIG. 11 so that the overlay member can be rotated upward away from the screen as will be explained in connection with FIG. 11. As can be seen in the top view of FIGS. 9 there is a bridge piece 57 which is also shown in FIG. 10. The bridge piece 57 is used to connect two upper sections of the hood. The hood section, such as section 59 shown in dashed line, is slipped into the slot 61 (shown in FIG. 10) while the matching hood section (not shown) which would be on the right hand side of the drawing would slip into slot 63. The slots 61 and 63 do not have to be completely occupied which enables the bridge section 57 to accommodate different gaps between righthand and lefthand hood sections. The bridge section 57 insures that the hood will completely block the ambient light and prevent light from passing through any cracks between where the hood section might abut, if the hood sections were designed to approximately meet.

FIG. 11 is pictorial of the anti-reflection overlay member with a hood. Note the brackets 65 and 67. Brackets 65 and 67 are secured by the sleeves 69 and 71 to the housing of the display screen. Accordingly, the overlay member can be rotated out of the drawing (away from the screen) to permit cleaning or other house keeping functions.

The present invention provides a "one size fits all" support means because there need be only size support piece made or one size corner shaped support piece made for all rectangular shaped screens. Most of the screens in the field are rectangular shaped so their overlays are rectangular shaped and a "one size" corner shaped support member can be fitted on all four corners. The one size corner shaped support (as well as the other support members such as the filler pieces, and linear pieces) are secured to the anti-reflection glass, or plastic or combination thereof, by a hot melt glue, or polymerizing resin such as a polyester expoxy, or a contact cement and the like. One of the main advantages of the present inventions is that it can be supplied for machines, or terminals, which are already in the field and need updating to reduce fatigue, etc. If every different screen needed a framed overlay made at the factory then the distributor would have to stock literally thousands of such fully assembled anti-reflection overlay assemblies. The present invention makes such over stocking of overlay inventory unnecessary.

The anti-reflection glass that I have employed in a preferred embodiment is GLAREBAN (a trademark of Denton Vacuum Inc.) which is manufactured by Denton Vacuum Inc. of Cherry Hill, NJ.

I claim:

1. A support arrangement for holding a light anti-reflection overlay member in close proximity to a visual display means, said light anti-reflection overlay member having a thickness dimension, comprising in combination: at least four support members, each of said support members having a slot therein, wherein said slot is substantially equal to said thickness dimension of said light anti-reflection overlay member and each of said support members having a front and rear surface, each of said support members being formed of a material which is readily cuttable so that the lengths of such support members can be readily reduced to accommodate the dimensions of said light anti-reflection overlay members; each of said support members disposed so that its slot is fitted over a different position on said light anti-reflection overlay member; a plurality of holding means with each secured to the rear surface of a different one of said support members, said holding means formed to be affixable to a display screen device in order to hold said light anti-reflection overlay member between a viewer and said display screen device and further formed to permit said support members to be removable from said display screen device.

2. A support arrangement according to claim 1 wherein each of said holding means is formed of first and second sections and wherein said first sections are secured to said support members and said second sections are secured to said display screen device and wherein said first and second sections are formed to be interlockable whereby when said first and second sections are interlocked said light anti-reflection overlay members is mounted on said display screen device.

3. A support arrangement according to claim 2 wherein said first section is formed of material having hooks therein and said second section is formed of material having loops therein.

4. A support arrangement according to claim 1 wherein there is further included filler members which have slots therein which are equal to the slots in said support members and which filler members are formed to fit between the ends of said support members.

* * * * *